United States Patent
Adkins et al.

(10) Patent No.: US 8,383,733 B2
(45) Date of Patent: Feb. 26, 2013

(54) LOW-VISCOSITY POLYMER POLYOLS CHARACTERIZED BY A HIGH HYDROXYL NUMBER

(75) Inventors: Rick L. Adkins, Hurricane, WV (US); Shriniwas S. Chauk, Charleston, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 13/285,057

(22) Filed: Oct. 31, 2011

(65) Prior Publication Data

US 2012/0041144 A1 Feb. 16, 2012

Related U.S. Application Data

(63) Continuation of application No. 11/223,167, filed on Sep. 9, 2005, now abandoned.

(51) Int. Cl.
- C08F 4/00 (2006.01)
- C08F 2/00 (2006.01)
- C08F 4/32 (2006.01)
- C08J 9/00 (2006.01)

(52) U.S. Cl. ........ 525/263; 526/222; 526/223; 526/225; 521/50

(58) Field of Classification Search .................. 525/263; 526/222, 223, 225; 521/50
See application file for complete search history.

(56) References Cited

U.S. PATENT DOCUMENTS

| | | |
|---|---|---|
| RE28,715 E | 2/1976 | Stamberger |
| RE29,118 E | 1/1977 | Stamberger |
| 4,522,976 A | 6/1985 | Grace et al. |
| 4,690,956 A | 9/1987 | Ramlow et al. |
| 6,172,164 B1 * | 1/2001 | Davis et al. ............... 525/263 |
| 2006/0025491 A1 | 2/2006 | Adkins et al. |
| 2006/0025492 A1 | 2/2006 | Chauk |
| 2006/0025558 A1 | 2/2006 | Adkins et al. |

FOREIGN PATENT DOCUMENTS

EP   0439755 A2   8/1991

* cited by examiner

Primary Examiner — William Cheung
(74) Attorney, Agent, or Firm — N. Denise Brown

(57) ABSTRACT

The present invention relates to novel polymer polyols which have low viscosities and high hydroxyl numbers, and to a process for the preparation of these novel polymer polyols. These polymer polyols have hydroxyl numbers of $\geq 20$, solids contents of about 30 to about 65% by weight and a viscosity that is less than or equal to: $be^{[2.7c]}$. These comprise the reaction product of a base polyol, a preformed stabilizer and at least one ethylenically unsaturated monomer, in the presence of a free-radical polymerization initiator and at least one polymer control agent. The base polyol has a hydroxyl number of 60 to 1900, a functionality of 1 to 10, and an equivalent weight of 30 to 900.

27 Claims, No Drawings

LOW-VISCOSITY POLYMER POLYOLS CHARACTERIZED BY A HIGH HYDROXYL NUMBER

CROSS-REFERENCE TO RELATED APPLICATIONS

The present application is a continuation application of U.S. application Ser. No. 11/223,167, filed on Sep. 9, 2005, now abandoned.

BACKGROUND OF THE INVENTION

The present invention relates to low viscosity polymer polyols that have a high hydroxyl number and a solids content of about 30 to about 65% by weight. This invention also relates to a process for the preparation of these novel polymer polyols. These polymer polyols have hydroxyl numbers of $\geq 20$, solids contents of about 30 to about 65% by weight and a viscosity that is less than or equal to: $be^{[2.7c]}$. These comprise the reaction product of a base polyol, a preformed stabilizer and at least one ethylenically unsaturated monomer, in the presence of a free-radical polymerization initiator and at least one polymer control agent.

Polymer polyol compositions are commercial products that have found use in a variety of applications primarily as constituents in the production of polyurethanes. Polyurethanes are suitable for the production of coatings, adhesives, sealants, elastomers, and flexible, semi-flexible and rigid foams. The primary function of polymer polyols is to enhance the hardness or stiffness of the polyurethane and, in particular, to enhance the load bearing or energy adsorbing capacity of polyurethane foams. End-use applications of polyurethane foams include, for example, mattresses, furniture, carpet pad; packaging and energy management, thermal insulation, and automotive seating, trim, headliners, sound insulation, crash pads, etc.

The basic patents relating to such polymer polyol compositions are Stamberger, U.S. Pat. Re. 28,715 (reissue of U.S. Pat. No. 3,383,351) and U.S. Pat. Re. 29,118 (reissue of U.S. Pat. No. 3,304,273). As described therein, a stable dispersion of polymer particles in a polyol can be produced by polymerizing one or more ethylenically unsaturated monomer dissolved or dispersed in a polyol in the presence of a free radical catalyst.

Initially, the primary polymer polyol compositions accepted commercially used acrylonitrile in its manufacture. Many of these compositions possessed undesirably high viscosities for certain applications. More recently, acrylonitrile-styrene monomer mixtures have been used commercially to make the polymer component of polymer polyols. The expanding demand for polymer polyols has highlighted several product needs and this has spawned additional advances in technology.

Polymer polyols derived from such high styrene monomer mixtures appear incapable of satisfying ever-increasing market needs, which include rigorous stability, filterability and low-viscosity requirements, and increased load-bearing characteristics in polyurethane foams. It is known that polyurethane foams with increased load-bearing characteristics can be obtained by increasing the polymer or solid contents and/or by increasing the functionality and hydroxyl number of the polyol. Thus, polymer polyols having high solids contents, i.e. 30 to 60 weight percent or higher, are desirable. However, an increase in the solids contents of polymer polyols is, generally, at the expense of the other properties (i.e. filterability, stability and viscosity) of the polymer polyol. It is desirable that polymer polyols have high solids contents, with relatively low viscosities, and good filterability.

Employment of high styrene monomer mixtures and high solid content polymer polyols, by prior practices, generally resulted in undesirably high viscosity polymer polyols. The viscosity of a polymer polyol should be sufficiently low for ease of handling during its manufacture. In addition, the viscosity should facilitate transport, handling and, ultimately, adequate processability, in the employed foam processing equipment. Because of increased use of sophisticated mixing systems, such as impingement systems, excessive viscosity of the polymer polyol is becoming a significant problem. The need for lower viscosity polymer polyols is apparent to satisfy these increased demands in the art.

As indicated, polymer polyol stability is a concern to makers of polyurethanes. At one time, seediness or filterability, a measure of stability of polymer polyols, was not a major issue in commercial practices. However, advances in the state of the art of polyurethane production such as high pressure carbon dioxide injection have resulted in revisions in polymer polyol stability and filterability criteria.

With commercial developments in sophisticated, high-speed and large-volume equipment and systems for handling, mixing and reacting polyurethane-forming ingredients have evolved the need for highly stable and low viscosity polymer polyols. Polymer polyols have certain minimum requirements for satisfactory processing in such sophisticated foam equipment. Typically, the prime requirement is that the polymer polyols possess sufficiently small particles so that filters, pumps and the like do not become plugged or fouled in relatively short periods of time.

Though there have been advances in reduction in viscosity and increase in solids of polymer polyols, there remains a need for improvement in viscosity reduction and increase in solids content. Greater reductions in viscosity are needed to meet market demands and greater effective increases in solids content are also needed by the market. More importantly, there is a need for technology in polymer polyols that maximizes viscosity reduction while also providing a viable mechanism to higher solids content.

U.S. Pat. No. 4,522,976 discloses polymer polyol dispersions in a mixture of low molecular weight polyols and polyether polyols, and the suitability of these dispersions for preparing foams. These polymer polyols are prepared by polymerizing 25 to 70% by weight of one or more ethylenically unsaturated monomers in a polyol mixture comprising (1) 25 to 99% by wt. of a polyol containing from 2 to 8 hydroxyl groups and having an equivalent weight of 30 to 200, and (2) from 1 to 75% by wt. of a macromer containing induced unsaturation.

Polymer polyols dispersions and a process for their production are also disclosed in U.S. Pat. No. 4,690,956. These polymer polyol dispersions are prepared by free-radical polymerization of an ethylenically unsaturated monomer or monomers in the presence of a reaction moderator in a polyol mixture of polyether polyol and a macromer which contains induced unsaturation. The reaction moderator has a fumarate containing polyetherester polyol as the unsaturation moiety, and at least 50% of the ethylenically unsaturated monomer is acrylonitrile.

Surprisingly, it has now been found that the good stability and filterability of a polymer polyol can be achieved at a very high solids level in a base polyol having a high hydroxyl number. In accordance with the present invention, the combination of high hydroxyl number/low molecular weight base polyols with a preformed stabilizer in a polymer polyol result in the final product having a significantly lower viscosity.

SUMMARY OF THE INVENTION

This invention relates to low viscosity polymer polyols which are characterized by high hydroxyl numbers, and to a process for the preparation of these low viscosity polymer polyols which have high hydroxyl numbers.

The low viscosity polymer polyols of the present invention are characterized by an OH number $\geq 20$, viscosities that are less than or equal to:

$$be^{[2.7c]}$$

wherein:
b: is the viscosity of the base polyol
and
c: is [% solids/(100-% solids)], and have a solids content of about 30% to about 65% by weight, based on the total weight of the polymer polyol.

These polymer polyols comprise the reaction product of (A) a base polyol having a hydroxyl number of from about 60 to about 1900, preferably about 70 to about 600 and most preferably about 90 to about 400, a functionality of about 1 to about 10, preferably about 2 to about 6 and most preferably about 2 to 3, and having an equivalent weight of about 30 to about 900, preferably about 100 to about 600 and most preferably about 200 to about 500; (B) a preformed stabilizer; and (C) at least one ethylenically unsaturated monomer; in the presence of (D) a free-radical polymerization initiator; and (E) at least one polymer control agent.

The process for preparing the low viscosity polymer polyols of the present invention comprises reacting: (A) a base polyol having a hydroxyl number of from about 60 to about 1900, preferably about 70 to about 600 and most preferably about 90 to about 400. a functionality of about 1 to about 10, preferably about 2 to about 6 and most preferably about 2 to 3, and having an equivalent weight of about 30 to about 900, preferably about 100 to about 600 and most preferably about 200 to 500; (B) a preformed stabilizer; and (C) at least one ethylenically unsaturated monomer; in the presence of (D) a free-radical polymerization initiator; and (E) at least one polymer control agent.

DETAILED DESCRIPTION OF THE INVENTION

As used herein, the following terms shall have the following meanings.

The term "monomer" means the simple unpolymerized form of a chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), optionally, in a polymer control agent, PCA, (i.e. methanol, isopropanol, toluene, ethylbenzene, etc.) and/or optionally, in a polyol, to give a co-polymer (i.e. a dispersion having e.g. a low solids content (e.g. <20%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein "viscosity" is in centistokes (cSt) measured at 25° C. on a Cannon Fenske viscometer.

Suitable polyols to be used as the base polyols in the present invention include, for example, polyether polyols. Suitable polyether polyols include those having a functionality of at least about 1 (i.e. a polyether monol), and preferably at least about 2. The functionality of suitable polyether polyols is less than or equal to about 10, preferably less than or equal to about 6, and more preferably less than or equal to about 3. The suitable polyether polyols may also have functionalities ranging between any combination of these upper and lower values, inclusive, e.g. from about 1 to about 10, preferably from about 2 to about 6, and more preferably about 2 to about 3. The OH numbers of suitable polyether polyols is at least about 60, preferably at least about 70, and more preferably at least about 90. Polyether polyols typically also have OH numbers of less than or equal to about 1900, preferably less than or equal to about 600, and more preferably less than or equal to about 400. The suitable polyether polyols may also have OH numbers ranging between any combination of these upper and lower values, inclusive, e.g. from about 60 to about 1900, preferably from about 70 to about 600, and more preferably from about 90 to about 400. The (number average) equivalent weights of suitable polyether polyols is typically greater than about 30, preferably at least about 100 and more preferably at least about 200. Polyether polyols typically have (number average) equivalent weights of less than or equal to 900, more preferably less than or equal to 600 broad limit and more preferably less than or equal to 500. The suitable polyether polyols may also have (number average) equivalent weights ranging between any combination of these upper and lower values, inclusive, e.g. from about 30 to about 900, preferably from about 100 to about 600 and more preferably from about 200 to about 500.

These polyether polyols may also have functionalities ranging from about 1 to about 10, preferably from about 2 to about 6, and more preferably from about 2 to about 3; OH numbers ranging from about 60 to 1900, preferably from about 70 to about 600, and more preferably from about 90 to about 400; and (number average) equivalent weights ranging from greater than 30 to about 900, preferably about 100 to 600 and more preferably about 200 to 500.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the molecular weight of the polyol.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylol-propane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctane, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

It should also be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

Suitable preformed stabilizers for the present invention are preformed stabilizers which are known in the art and include without limitation those described in the references discussed herein. Preferred preformed stabilizers include those discussed in, for example, U.S. Pat. No. 4,148,840 (Shah), U.S. Pat. No. 5,196,476 (Simroth), U.S. Pat. No. 5,364,906 (Critchfield) U.S. Pat. No. 5,990,185 (Fogg), U.S. Pat. No. 6,013,731 (Holeschovsky et al), and U.S. Pat. No. 6,455,603 (Fogg), the disclosures of which are herein incorporated by reference.

Suitable preformed stabilizers herein include those so-called intermediate obtained by reacting a macromolecule with one or more monomers (i.e. acrylonitrile, styrene, methyl methacrylate, etc.), to give a copolymer (dispersion having a low solids content, e.g. <25% or soluble grafts, etc.). The macromolecule may be obtained by linkage of polyether polyols through coupling with a material such as a polyisocyanate, epoxy resin, etc. or by other means to produce a high molecular weight polyol. The macromolecule preferably contains reactive unsaturation and is, in general, prepared by the reaction of the selected reactive unsaturated compound with a polyol. The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation both are constricted by the dispersion stability that the precursor stabilizer is capable of imparting to the polymer polyol composition. The specific level of unsaturation utilized further will depend on the molecular weight and functionality of the polyol used to prepare the precursor stabilizer. Optionally, a diluent, polymer control agent or chain transfer agent molecular weight regulator may be present.

Suitable preformed stabilizers for the present invention also include those which comprise the free radical polymerization product of (1) a free radically polymerizable ethylenically unsaturated monomer and (2) an adduct of a alcohol having the average formula:

wherein A is a polyvalent organic moiety, the free valence of which is $\geq 1$, R is the divalent residue comprising an alkylene oxide moiety, and X is one or more of an organic moiety containing reactive unsaturation, copolymerizable with (A), and hydrogen, about one of such X is the organic moiety containing reactive unsaturation and the remaining X's are hydrogen, in which the adduct may be further adducted with an organic polyisocyanate.

Other suitable preformed stabilizers include those which are prepared using as precursor stabilizers compounds obtained by reacting a silicon atom containing compound corresponding to one or the formulas:

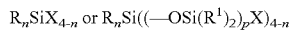

wherein:
  each R: independently represent saturated or unsaturated hydrocarbyl groups, with at least one R group being an olefinically unsaturated hydrocarbyl group,
  $R^1$: represents a hydrocarbyl group,
  X: represents a $C_1$ to $C_{10}$ alkoxy group,
  n: represents an integer from 1 to 3,
  and
  p: is an integer greater than zero;
with a polyether polyol having an average molecular weight in excess of 400 and a hydroxyl number in the range of 20 to 280. Of these, the preferred precursor stabilizers are the reaction products of vinyltrimethoxy silane, vinyltriethoxy silane or vinyltripropoxy silane with a polyether polyol having an average molecular weight in excess of 400 and a hydroxyl number in the range of 20 to 280. Such precursor stabilizers are described in U.S. Pat. No. 4,883,832 (Cloetens et al), the disclosure of which is herein incorporated by reference.

Among the preferred preformed stabilizers are those which are described in, for example, U.S. Pat. No. 5,990,185, the disclosure of which is herein incorporated by reference, wherein a PFS is prepared by reacting a polyol, a precursor stabilizer, a monomer and a free-radical polymerization initiator to a reaction zone maintained at a temperature sufficient to initiate free radical polymerization, and under sufficient pressure to maintain only liquid phases in the reaction zone, for a period of time sufficient to react essentially all of the precursor stabilizer and recovering a heterogeneous mixture containing the preformed stabilizer composition.

The preformed stabilizer of the invention is derived from the following composition, comprising:
(1) a macromolecule, macromer or other suitable precursor stabilizer;
(2) a free radically polymerizable ethylenically unsaturated monomer, preferably acrylonitrile and at least one other ethylenically unsaturated comonomer copolymerizable therewith;
(3) a free radical polymerization initiator;
(4) a polymer control agent in which (1), (2), and (3) are soluble, but in which the resultant preformed stabilizer is essentially insoluble;
and/or
(5) optionally, one or more polyols.

As described in, for example, U.S. Pat. No. 5,196,476, the disclosure of which is herein incorporated by reference, suitable preformed stabilizers can be prepared by reacting a combination of components (1), (2), (3) and (4), and optionally, (5), as described above, in a reaction zone maintained at a temperature sufficient to initiate a free radical reaction, and under sufficient pressure to maintain only liquid phases in the reaction zone, for a sufficient period of time to react (1), (2) and (3); and recovering a mixture containing the preformed stabilizer dispersed in the polymer control agent.

Suitable compounds to be used as the macromolecule, the macromer or the precursor stabilizer (i.e. component (1) above) include, for example, compounds which contain reactive unsaturation (e.g. acrylate, methacrylate, maleate, fumarate, isopropenylphenyl, vinyl silyl, etc.), obtained by reacting compounds containing reactive unsaturation with alcohols having the average formula $A(OROX)_{\geq 1}$. Examples of unsaturation containing compounds include but are not limited to, maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacroyl chloride, and glycidyl methacrylate, vinylmethoxysilane, etc.

The reactive unsaturated compound may also be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate as described in, for example, U.S. Pat. No. 4,521,546, the disclosure of which is herein incorporated by reference, or by reaction with an unsaturated mono-isocyanate such as, for example, 1,1-dimethyl-m-isopropenylbenzyl isocyanate, etc.

Suitable compounds to be used component (2) above, include reactive unsaturated compounds, particularly those that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable to be employed in making the pre-formed stabilizer. Of the above monomers, the monovinylidene aromatic monomers, particularly styrene, and the ethylenically unsaturated nitriles, particularly acrylonitrile are preferred.

It is preferred that (2) is acrylonitrile and at least one other ethylenically unsaturated comonomer copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like.

It is particularly preferred to utilize acrylonitrile with a comonomer and to maintain a minimum of about 5 to 15 percent by weight acrylonitrile in the system. Styrene will generally be preferred as the comonomer, but methyl methacrylate or other monomers may be employed in place of part or all of the styrene. A preferred monomer mixture (2) used to make the preformed stabilizer composition (B) comprises mixtures of acrylonitrile and styrene. The weight proportion of acrylonitrile can range from about 20 to 80 weight percent of the comonomer mixture, more typically from about 30 to about 50 weight percent, and styrene can accordingly vary from about 80 to about 20 weight percent, more preferably from 70 to 50 weight percent of the mixture. An acrylonitrile to styrene ratio in the monomer mixture of from about 20:80 to 80:20 is particularly preferred, even more particularly about 30:70 to 50:50.

The free radical polymerization initiators suitable for use as component (3) in the suitable preformed stabilizers of the present invention encompass any free radical catalyst suitable for grafting of an ethylenically unsaturated polymer to a polyol. Examples of suitable free-radical polymerization initiators for the present invention include initiators such as, for example, peroxides including both alkyl and aryl hydro-peroxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful catalysts also include, for example, those catalysts having a satisfactory half-life within the temperature ranges used to form the preformed stabilizer, i.e. the half-life should be about 25 percent or less of the residence time in the reactor at a given temperature. Representative examples of useful catalyst species include t-butyl peroxy-2-ethyl-hexanoate, t-butylperpivalate, t-amyl peroctoate, 2,5-dimethyl-hexane-2,5-di-per-2-ethyl hexoate, t-butylperneodecanoate, and t-butylperbenzoate. Useful also are the azo catalysts such as azobis-isobutyronitrile, 2,2'-azo bis-(2-methylbutyronitrile), and mixtures thereof. The preferred free radical catalysts are peroxides such as tertiary butyl peroctoate.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, optionally the liquid diluent and/or the polymer control agent). Up to a certain point, increases in the catalyst concentration result in increased monomer conversion and grafting; but further increases do not substantially increase conversion. Catalyst concentrations which are too high can cause cross-linking in the preformed stabilizer (B). The particular catalyst concentration selected will usually be an optimum value considering all factors, including costs.

In accordance with the present invention, components (1), (2), and (3) of the pre-formed stabilizer are soluble (4) the polymer control agent. However, the resultant preformed stabilizer (B) is essentially insoluble in (4) the polymer control agent. This component may be one polymer control agent or a mixture of polymer control agents. Suitable compounds to be used as polymer control agents in accordance with the present invention include various mono-ols (i.e. monohydroxy alcohols, aromatic hydrocarbons, ethers, and other liquids. As long as the compound used as the polymer control agent does not adversely affect the performance of the preformed stabilizer (B), it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. However, it should not form two phases under the reaction conditions and it should be readily stripped from the final polymer/polyol.

The selection of mono-ol is typically an alcohol containing at least one carbon atom, such as methanol, ethanol, n-propanol, iso-propanol, n-butanol, sec.-butanol, t-butanol, n-pentanol, 2-pentanol, 3-pentanol, and the like, and mixtures of the same. The preferred mono-ol is isopropanol. The concentration of polyol (when used) in the polymer control agent (4), is limited to an amount below which gelling occurs in the preformed stabilizer (B).

The polyol components suitable as component (5) in the present invention include typically the alkylene oxide adduct of $A(OH)_{\geq 3}$ described above. Though the polyol used as component (5) can encompass the variety of polyols described above, including the broader class of polyols described in U.S. Pat. No. 4,242,249, at column 7, line 39 through column 9, line 10, the disclosure of which is herein incorporated by reference. It is preferred that the polyol component (5) be the same as or equivalent to the polyol used in the formation of precursor used to prepare the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (B), is as follows:

| Component of Formulation | Amount, weight % |
|---|---|
| 1 | about 10 to 40 |
| 2 | about 10 to 30 |
| 3 | about 0.01 to 2 |
| 4 | about 30 to 80 |
| 5 | about 0 to 40 |

A preferred formulation for forming the preformed stabilizer (B) is as follows:

| | |
|---|---|
| 1 | 10 to 40, more preferably 15 to 35; |
| 2 | 10 to 30, more preferably 15 to 25; |
| 3 | 0.1 to 2, more preferably 0.1 to 1, |
| 4 | 30 to 80, more preferably 40 to 70 |
| 5 | 0 to 20, more preferably 0 to 10 |

In the formulations proposed above for the preformed stabilizer (B), the %'s by weight of components 1, 2, 3 and 4, and optionally 5, totals 100% by weight of component (B), the preformed stabilizer.

The process for producing the preformed stabilizer (B) is similar to the process for making the polymer polyol. The temperature range is not critical and may vary from about 80° C. to about 150° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g. —a stirred flask or stirred autoclave). The reactors of this type keep the reaction mixture relatively homogeneous and so prevent localized high monomer to macromer ratios such as occur in tubular reactors, where all of the monomer is added at the beginning of the reactor.

The preformed stabilizer (B) of the present invention comprise dispersions in the diluent and any unreacted monomer in which the preformed stabilizer (B) is probably present as individual molecules or as groups of molecules in "micelles," or on the surface of small polymer particles.

Suitable compounds to be used as the ethylenically unsaturated monomers, i.e. component (C) the present invention include, for example, those ethylenically unsaturated monomers described above with respect to the preformed stabilizer.

Suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 40:60, more preferably from about 75:25 to 45:55. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols comprising a preformed stabilizer is preferably at least about 30% by weight, more preferably at least about 40% by weight, and most preferably at least about 45% by weight, based on 100% by weight of the polymer polyol. The quantity of ethylenically unsaturated monomer(s) present in the polymer polyols is preferably about 65% by weight or less, more preferably at least about 60% by weight or less. The polymer polyols of the present invention typically has a solids content ranging between any combination of these upper and lower values, inclusive, e.g. from 30% to 65% by weight, preferably from 30% to 60% by weight, based on the total weight of the polymer polyol. It is more preferred that the solids content be less than 60% by weight, more particularly preferred that the solids content be less than or equal to about 59% by weight, most preferred that the solids content be less than or equal to about 58% by weight, and most particularly preferred that the solids content be less than or equal to about 55% by weight.

Suitable free-radical initiators to be used as component (D) in the present invention include, for example, those as described previously for the formation of the preformed stabilizers. Examples of suitable free-radical polymerization initiators for the present invention include initiators such as, for example, peroxides including both alkyl and aryl hydroper-oxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroxy pivalate, t-amyl peroctoate, 2,5-dimethyl-hexane-2,5-di-per-2-ethyl hexoate, t-butyl perneodecanoate, t-butylper-benzoate and 1,1-dimethyl-3-hydroxybutyl peroxy-2-ethylhexanoate, and azo catalysts such as azobis (isobutyro-nitrile), 2,2'-azo bis-(2-methoxyl-butyronitrile), and mixtures thereof. Most preferred are the acyl peroxides described above and the azo catalysts. A particularly preferred initiator comprises azobis(isobutyronitrile).

Particularly preferred in the practice of the invention, are the use of azo catalysts and the aforementioned acyl peroxides of the above formula. The preferred acyl peroxides include those which have the unique advantage of effecting the desired degree of polymerization essentially without raising the viscosity of the polymer polyol over that obtained with the azo catalyst. This enhances one's ability to achieve higher solids polymer polyols with good product stability without raising product viscosity. Such acyl peroxides can be used in molar amounts substantially less than the amounts required when using other free radical catalysts in forming the polymer polyols.

The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents for use as component (E) in the present invention include, for example, those known to be useful in polymer polyols and the processes of preparing polyols such as those described in, for example, U.S. Pat. Nos. 3,953,393, 4,119,586, 4,463,107, 5,324,774, 5,814,699 and 6,624,209, the disclosures of which are herein incorporated by reference. Some examples of suitable compounds to be used as polymer control agents include various mono-ols (i.e. monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

Suitable polymer control agents include, for example, one or more mono-ol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred mono-ol is isopropanol.

Other known polymer control agents include compounds such as, for example, ethylbenzene and toluene. In accordance with the present invention, the most preferred polymer control agents include isopropanol, ethanol, tert-butanol, toluene, ethylbenzene, etc.

The quantity of total polymer control agent to be employed in the present invention is greater than about 5.0% by weight, preferably at least about 5.2%, more preferably at least about 5.5% and most preferably at least about 6.0% by weight, based on the 100% by weight of all components which comprise the polymer polyol, prior to stripping the product, (i.e. components (A), (B), (C), (D) and (E)). The quantity of total polymer control agent is also employed in amounts of less than or equal to 20% by weight, preferably less than or equal to about 18%, more preferably less than or equal to 16% and most preferably less than or equal to about 15% by weight, based on the total weight of all components charged to the reactor. The amount of total polymer control agent may be employed in any amount ranging between any combination of these lower and upper values, inclusive, e.g., from greater than about 5.0% to about 20% by weight, preferably from about 5.2% to about 18% by weight, more preferably from about 5.5% to about 16% by weight and most preferably from about 6.0% to about 15% by weight, based on 100% by weight of total polymer control agent.

In addition, the polymer polyol and the process of preparing the polymer polyol may optionally comprise a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is preferably used in an amount of from about 0.1 to about 2 wt. %, more preferably from about 0.2 to about 1 wt. %, based on the total weight of the polymer polyol (prior to stripping).

The polymer polyols from the present invention can be made using any process (including continuous and semi-batch) and reactor configuration that is known to be suitable to prepare polymer polyols, such as, for example, a two-stage reaction system comprising a continuously-stirred tank reactor (CSTR) fitted with impeller(s) and baffles (first-stage) and a plug-flow reactor (second stage). A typical reaction system may be equipped with any combination of jacket/half-coil, internal coil/tubes or external loop/cooler to remove the heat of reaction. Furthermore, the reaction system can utilize a wide range of mixing conditions. The reaction system may be characterized by energy inputs of from 0.5 to 350 horsepower per 1000 gallons, with preferred mixing energies of from 2 to 50 horsepower per 1000 gallons on average for the bulk phase volume of each reactor a particularly useful mixing power input. Mixing can be provided by any combination of impeller(s) and pump-around loop/jet mixing. It will be appreciated by one of ordinary skill in the art that the optimum energy input will most likely vary with the dispersion stability and the molecular weight of the base polyether polyol, e.g., a greater amount of energy is preferred for products with higher viscosities. In addition, polymer polyols of the present invention can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare polymer polyols including those described in the present invention, a residence time ranging from about 30 to about 180 minutes may be particularly useful.

The reactants are pumped from feed tanks through an in-line static mixer, and then, through a feed tube into the reactor. It may be particularly useful to prepare a premix of the initiator with part of the polyol stream, as well as of polyol and stabilizer. Other process conditions, which may be useful, include cooling of the feed tube in the reactor. Furthermore, the suitable reaction conditions for polymer polyols in general as well as the specific products of the present invention mixture are characterized by a reaction temperature in the range of 100 to 150° C. and a pressure in the range of 30 to 60 psig. Typically, the product can then treated in a single or multi staged stripping step to remove volatiles before entering a stage, which can essentially be any combination of filtration and/or product cooling. In the present case, the wt-% total polymer in the product was calculated from the concentrations of monomers measured in the crude polymer polyol before stripping.

In accordance with the present invention, the polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 150° C. or perhaps greater, preferably from about 100° C. to about 140° C., with a more preferred range being from 115° C. to 125° C. As has been noted herein, the catalyst and temperature should be selected such that the catalyst has a reasonable rate of decomposition with respect to the hold-up time in the reactor for a continuous flow reactor or the feed time for a semi-batch reactor.

A suitable continuous process for making polymer polyols comprises (1) providing a heterogenous mixture of the preformed stabilizer and, optionally, liquid diluent, in combination with a polyol, a free radically polymerizable ethylenically unsaturated monomer, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated monomer to form a heterogenous mixture containing the enhanced polymer polyol, unreacted monomers and diluent, and stripping the unreacted monomers and diluent from the enhanced polymer polyol to recover the unreacted monomers and diluent. This continuous process allows the manufacture of high solids, white polymer polyols with lower viscosities and good stability. This product has excellent product stability and requires less free radical catalyst in the production process. Other pertinent details for the continuous process of preparing polymer polyols can be found in, for example, U.S. Pat. No. 5,196,476, the disclosure of which is herein incorporated by reference.

The mixing conditions employed are those obtained using a back mixed reactor (e.g. —a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention have a viscosity of less than or equal to:

be$^{[2.7c]}$ at 25° C., wherein:

b=viscosity of base polyol in centistokes (cSt), and c=weight % of solids in polymer polyol/(100−weight % solids in polymer polyol).

Polymer polyols of the present invention are typically characterized by an OH number of ≧20, preferably of ≧35, and more preferably of ≧50.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular those from the PCA and residues of monomers are generally stripped from the product by the usual method of vacuum distillation, optionally in a thin layer of a falling film evaporator. The monomer-free product may be used as is, or may be filtered to remove any large particles that may have been created.

In the preferred embodiment, all of the product (viz. 100%) will pass through the filter employed in the 150 mesh filtration hindrance (i.e. filterability) test that will be described in conjunction with the Examples. This ensures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. Furthermore, it is the intent of the preferred embodiment of the present to produce PMPOs which have lower viscosities and higher hydroxyl numbers than PMPOs which are produced using other processes.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of this invention.

Polyol A: A propylene oxide adduct of sorbitol, containing 8% ethylene oxide with a hydroxyl number of 28.

Base Polyol A: A propylene oxide adduct of trimethylolpropane with a hydroxyl number of about 380 and a viscosity of 660 centistokes (cSt) at 25° C.

Base Polyol B: A propylene oxide adduct of glycerin with a hydroxyl number of about 238, and a viscosity of 265 cSt at 25° C.

Base Polyol C: A propylene oxide adduct of ethylene glycol with a hydroxyl number of about 147, and a viscosity of 120 cSt at 25° C.

Base Polyol D: A propylene oxide adduct of glycerine with a hydroxyl number of about 168, and a viscosity of 240 cSt at 25° C.

Base Polyol E: A propylene oxide adduct of ethylene glycol with a hydroxyl number of about 111, and a viscosity of 163 cSt at 25° C.

PCA: Isopropanol, a polymer control agent

SAN: Styrene:acrylonitrile

TMI: Isopropenyl dimethyl benzyl isocyanate (an unsaturated aliphatic isocyanate) sold as TMI® by Cytec Industries TBPO: tert-Butyl peroxide AIBN: 2,2'-Azobisisobutyronitrile, a free-radical polymerization initiator commercially available as VAZO 64 from E.I. Du Pont de Nemours and Co.

Viscosity: Viscosities were measured by Cannon-Fenske viscometer (cSt at 25° C.)

Filtration Filterability is determined by diluting one part by

Hindrance weight sample (e.g. 200 grams) of polymer polyol (i.e. filterability): with two parts by weight anhydrous isopropanol (e.g. 400 grams) to remove any viscosity-imposed limitations and using a fixed quantity of material in relative to a fixed cross-sectional area of screen (e.g. 1⅛ in. diameter), such that all of the polymer polyol and isopropanol solutions passes by gravity through a 150-mesh screen. The 150-mesh screen has a square mesh with average mesh opening of 105 microns and it is a "Standard Tyler" 150 square-mesh screen.

General Procedure for Macromers:

Macromer A: Prepared by heating Polyol A (100 parts), TMI (2 parts), and 100 ppm stannous octoate catalyst at 75° C. for 2 hours.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±1° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation are disclosed in Table 1.

TABLE 1

| Preformed Stabilizer Composition | |
|---|---|
| | PFS A |
| PCA type | isopropanol |
| PCA concentration in feed, wt-% | 60.0% |
| Macromer | Macromer A |
| Macromer concentration in feed, wt-% | 24.0% |
| Monomers concentration in feed, wt-% | 15.9% |
| Styrene/acrylonitrile ratio in feed, wt-% | 50/50 |
| TBPO concentration, wt-% | 0.1% |

In the above table, the wt. % concentrations are based on the total feed.

Polymer Polyol Preparation:

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±1° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt-% total polymer in the product was calculated from the concentrations of monomers measured in the crude polymer polyol before stripping. The preformed stabilizer described above, i.e. PFS A, was used to produce Polymer Polyols A, B, C, D, E, F and G.

TABLE 2

Polymer Polyol Formulations and Properties

| Polymer Polyol | PMPO A | PMPO B | PMPO C | PMPO D | PMPO E | PMPO F | PMPO G |
|---|---|---|---|---|---|---|---|
| Base Polyol (% by wt.) | A (55) | B (50) | C (45) | D (45) | E (45) | C (50) | E (35) |
| Solids - % by wt. | 45 | 50 | 55 | 55 | 55 | 50 | 65 |
| S:AN wt. ratio | 64.5:35.5 | 64.5:35.5 | 62:38 | 62:38 | 62:38 | 62:38 | 62:38 |
| % by wt. PFS A | 6.67 | 8.33 | 12.5 | 12.5 | 12.5 | 8.33 | 14.58 |
| Total PCA (% by wt.) | 5.0 | 5.0 | 7.5 | 7.5 | 7.5 | 5.0 | 8.75 |
| AIBN Initiator | 0.25% | 0.25% | 0.32% | 0.32% | 0.32% | 0.25 | 0.35 |
| Viscosity (cSt, 25° C.) | 5335 | 3567 | 2630 | 4613 | 2941 | 1220 | 11,294 |
| OH number | 213 (ca) | 119 (ca) | 72.7 | 74.5 | 51.5 | 75.0 (ca) | 38.9 (ca) |
| 150-mesh filtration | 100% | 100% | 100% | 100% | 100% | 100% | 100% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, low-viscosity polymer polyol having a hydroxyl number of $\geq 20$, a viscosity that is less than or equal to:

$$be^{2.7c}$$

wherein:
b represents the base polyol viscosity,
and
c represents [wt. % solids in polymer polyol/(100−wt. % solids in polymer polyol)], having a solids content of 30% to 65% by weight, based on the total weight of the polymer polyol, comprising the reaction product of:

(A) a base polyol having a hydroxyl number of from 60 to 1900, a functionality of 1 to 10, and an equivalent weight of 30 to 900, (B) a preformed stabilizer,
and
(C) at least one ethylenically unsaturated monomer,
in the presence of
(D) a free-radical polymerization initiator,
and
(E) at least one polymer control agent.

2. The stable, low-viscosity polymer polyol of claim 1 which is characterized by a hydroxyl number of at least 35.

3. The stable, low-viscosity polymer polyol of claim 1, wherein (A) said base polyol has a hydroxyl number of from 70 to 600, a functionality of 2 to 6, and an equivalent weight of from 100 to 600.

4. The stable, low-viscosity polymer polyol of claim 1, wherein (A) said base polyol has an OH number of 90 to 400, a functionality of 2 to 3, and an equivalent weight of 200 to 500.

5. The stable, low-viscosity polymer polyol of claim 1, wherein (C) said ethylenically unsaturated monomer comprises a mixture of styrene and acrylonitrile.

6. The stable, low-viscosity polymer polyol of claim 1, wherein styrene and acrylonitrile are present in a weight ratio of from 80:20 to 40:60.

7. The stable, low-viscosity polymer polyol of claim 1, wherein (D) said free-radical polymerization initiator is selected from the group consisting of azo compounds, peroxide compounds and mixtures thereof.

8. The stable, low-viscosity polymer polyol of claim 7, wherein said azo compounds are selected from the group consisting of azobis(isobutyronitrile), 2,2'-azo bis(2-methylbutyronitrile) and mixtures thereof.

9. The stable, low-viscosity polymer polyol of claim 7, wherein said peroxide compounds are selected from the group consisting of acyl peroxides, alkyl peroxides and mixtures thereof.

10. The stable, low-viscosity polymer polyol of claim 1, wherein said polymer control agent comprises one or more alcohols containing at least one carbon atom.

11. The stable, low-viscosity polymer polyol of claim 10, wherein said polymer control agent comprises isopropanol.

12. The stable, low-viscosity polymer polyol of claim 1 which is characterized by a hydroxyl number of at least 50.

13. A process for preparing a stable, low-viscosity polymer polyol having a hydroxyl number of $\geq 20$, a viscosity that is less than or equal to:

be$^{[2.7c]}$ wherein:
b represents the base polyol viscosity, and
c represents [wt. % solids in polymer polyol/(100−wt. % solids in polymer polyol)], and a solids content of 30% to 65% by weight, based on the total weight of the polymer polyol, comprising (1) reacting:
(A) a base polyol having a hydroxyl number of from 60 to 1900, a functionality of 1 to 10, and an equivalent weight of 30 to 900,
(B) a preformed stabilizer, and
(C) at least one ethylenically unsaturated monomer,
in the presence of
(D) a free-radical polymerization initiator, and
(E) at least one polymer control agent.

14. The process of claim 13 in which the stable, low-viscosity polymer polyol is characterized by a hydroxyl number of at least 35.

15. The process of claim 13, wherein (A) said base polyol has a hydroxyl number of from 70 to 600, a functionality of 2 to 6, and an equivalent weight of from 100 to 600.

16. The process of claim 13, wherein (A) said base polyol has an OH number of 90 to 400, a functionality of 2 to 3, and an equivalent weight of 200 to 500.

17. The process of claim 13, (C) said ethylenically unsaturated monomer comprises a mixture of styrene and acrylonitrile.

18. The process of claim 17, wherein styrene and acrylonitrile are present in a weight ratio of from 80:20 to 40:60.

19. The process of claim 13, wherein (D) said free-radical polymerization initiator is selected from the group consisting of azo compounds, peroxide compounds and mixtures thereof.

20. The process of claim 19, wherein said azo compounds are selected from the group consisting of azobis(isobutyronitrile), 2,2'-azo bis(2-methylbutyronitrile) and mixtures thereof.

21. The process of claim 19, wherein said peroxide compounds are selected from the group consisting of acyl peroxides, alkyl peroxides, persulfates, perborates, percarbonates and mixtures thereof.

22. The process of claim 13, wherein said polymer control agent comprises one or more alcohols containing at least one carbon atom.

23. The process of claim 22, wherein said polymer control agent comprises isopropanol.

24. The process of claim 13 in which the stable, low-viscosity polymer polyol is characterized by a hydroxyl number of at least 50.

25. The process of claim 13 wherein the process comprises a semi-batch process.

26. The process of claim 13 wherein the process comprises a continuous process.

27. The stable, low-viscosity polymer polyol of claim 1, wherein (D) said free-radical polymerization initiator is selected from the group consisting of persulfates, perborates, percarbonates and mixtures thereof.

* * * * *